United States Patent [19]

Vinokurov et al.

[11] 4,239,999
[45] Dec. 16, 1980

[54] SUPER-CONDUCTIVE ELECTRICAL MACHINE HAVING AN IMPROVED SYSTEM FOR MAINTAINING VACUUM IN THE STATOR/ROTOR SPACE

[76] Inventors: Alexandr A. Vinokurov, ulitsa Polzunova, 31, kv. 314; Gennady S. Gorbunov, ulitsa Polzunova, 35, kv. 42; Jury S. Popov, ulitsa Bariernaya, 16, kv. 14, all of Novosibirsk; Jury V. Skachkov, Nevsky prospekt, 125, kv. 13, Leningrad; Iosif F. Filippov, ulitsa Pulkovskogo, 17, kv. 39, Leningrad; Gary M. Khutoretsky, ulitsa Altaiskaya, 20, kv. 5, Leningrad, all of U.S.S.R.

[21] Appl. No.: 855,314

[22] Filed: Nov. 28, 1977

[30] Foreign Application Priority Data

Nov. 30, 1976 [SU] U.S.S.R. ............................ 2421858

[51] Int. Cl.² .............................................. H02K 9/00
[52] U.S. Cl. ...................................... 310/52; 415/199.1
[58] Field of Search ...................... 310/10, 40, 52, 54, 310/64; 62/505, 514; 335/216; 415/199.1, 90

[56] References Cited

U.S. PATENT DOCUMENTS

| | | | |
|---|---|---|---|
| 3,809,933 | 5/1974 | Sugawara | 310/40 |
| 3,999,091 | 12/1976 | Kirtley | 310/52 |
| 4,017,755 | 4/1977 | Litz | 310/52 |
| 4,088,911 | 5/1978 | Wetzig | 310/52 |
| 4,101,793 | 7/1978 | Berthet | 62/505 |

*Primary Examiner*—R. Skudy
*Attorney, Agent, or Firm*—Lackenbach, Lilling & Siegel

[57] ABSTRACT

A super-conductive cryogen-cooled electrical machine comprises a rotor disposed within a hollow stator with an annular gap which is evacuated and kept under vacuum by means of at least two shells furnished with ports and position concentrically with a clearance or gap therebetween. One of said shells is supported in a cantilevered fashion by the rotor on the end face thereof to be coaxial therewith and the other being supported in a cantilevered fashion by the stator on the end face thereof opposite said end face of the rotor. The ports in the rotor-supported shells are made so that their axes form an acute angle α with tangent lines drawn to the shell periphery from the points where the port axes intersect the shell envelope in the direction of the rotor rotation, while the ports in the stator supported shells are made so as to form, in a similar way, an angle $\beta = 180° - \alpha$. The proposed construction of the electrical machine permits increasing the reliability and efficiency of the vacuum heat insulation of the rotor and reducing manufacture and operating costs.

1 Claim, 2 Drawing Figures

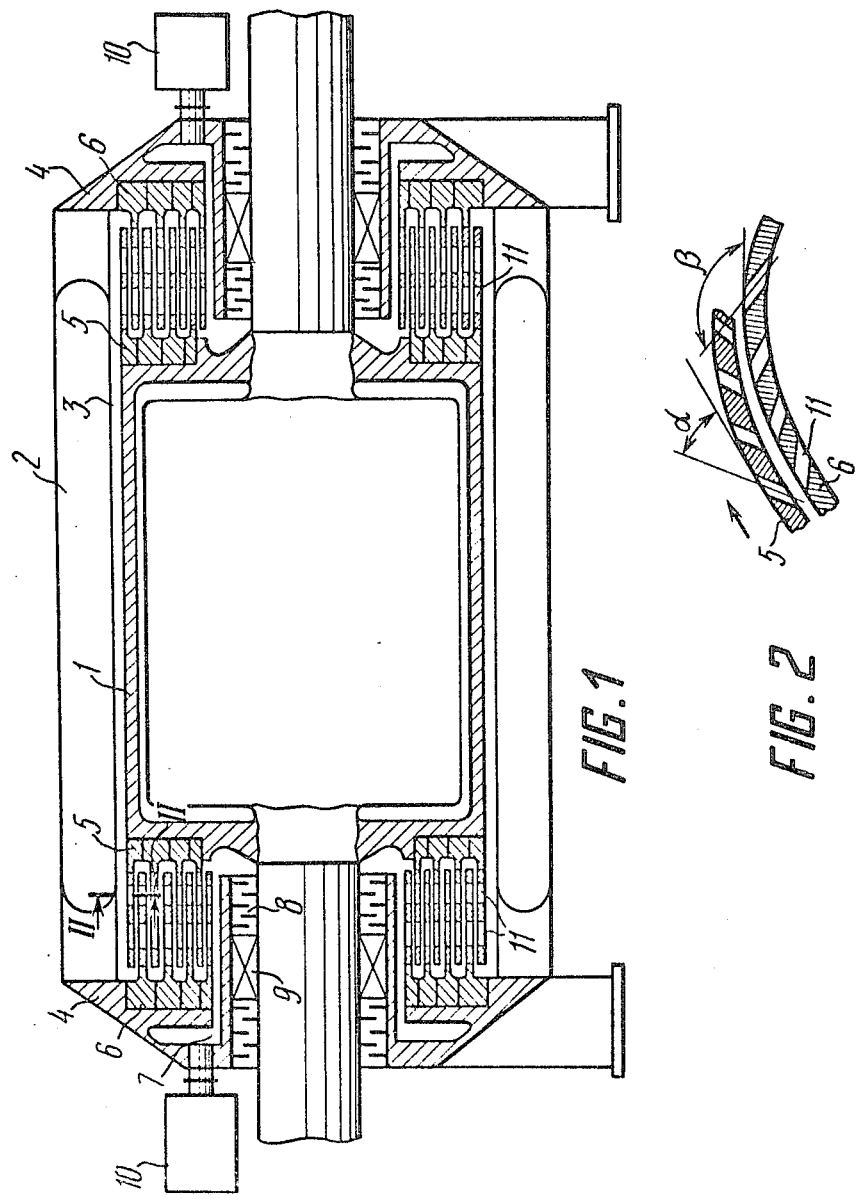

SUPER-CONDUCTIVE ELECTRICAL MACHINE HAVING AN IMPROVED SYSTEM FOR MAINTAINING VACUUM IN THE STATOR/ROTOR SPACE

FIELD OF THE INVENTION

The present invention relates to super-conductive electrical machines, and more particularly, to cryogen-cooled electrical machines.

While being intended mainly for cryogen-cooled electrical machines, the present invention may be used as well in a wide range of applications to achieve and maintain high vacua in vacuum apparatus and chambers.

BACKGROUND OF THE INVENTION

Commonly known cryogen-cooled electrical machines of a conventional design configuration comprise a superconducting field winding placed in a hollow rotor and secured therein. The field winding is cooled by a coolant to the superconducting state, e.g., by liquid helium admitted inside the rotor and reducing the temperature of 4.3° K.

To provide heat protection of the low temperature portion of the rotor, the latter is to be thermally insulated as required by heat conveyance from the ambient temperature zone to the cryogenic temperature zone. A vacuum space offers the best thermal insulating means for this case. To this end, an annular gap between the rotor and stator is evacuated. The loss of power in such an electrical machine will be lower, the higher vacuum is maintained in said gap. The best vacuum conditions are considered to be $10^{-5}$ torr.

One of the prior art cryogen-cooled electrical machines cf. U.S.S.R. Inventor's Certificate No. 547,926; Oct. 28, 1973) comprises a hollow stator and a rotor placed within the stator with an annular gap which is evacuated and kept under vacuum.

In the aforementioned electrical machine, a vacuum of $10^{-5}$ torr may be achieved only if the annular gap between the rotor and stator is connected via vacuum lines to a forevacuum and to a high-vacuum, e.g., turbomolecular, pumps. Such an evacuation system used to achieve and maintain the desired vacuum presents a number of self-contained units which, when combined with the electrical machine, make the overall design configuration rather complicated.

Besides, the efficiency of said system when used to achieve and maintain the desired vacuum in the electrical machine is considered low, because the lines communicating the gap with the pumps feature low throughput with respect to the rarefied gas. Moreover, accomplishment of vacuum-tight rotor shaft sealings has presented heretofore a serious design problem stemming from stringent requirements as to the purity of vacuum and high rotational speeds of the rotor shaft.

SUMMARY OF THE INVENTION

It is therefore an object of the present invention to provide a cryogen-cooled electrical machine with a more efficient and reliable method of maintaining vacuum in the gap between the rotor and stator.

Another object of this invention is a provide a cryogen-cooled electrical machine with reduced weight and dimensions.

Still another object is to provide an electrical machine of simplified construction.

These objects are attained by a cryogen-cooled electrical machine, comprising a hollow stator and a rotor placed within the stator with an annular gap which is evacuated and kept under vacuum. The machine is provided with at least two cylindrical shells with ports serving to achieve and maintain vacuum and the shells are disposed concentrically with a clearance therebetween, one of said shells being supported in a cantilevered fashion by the rotor on the end face thereof to be coaxial therewith and the other being supported in a cantilevered fashion by the stator on the end face thereof opposite said end face of the rotor. The ports in the rotor-supported shells are made so that their axes make an acute angle $\alpha$ with tangent lines drawn to the shell periphery from the points where the port axes intersect the shell envelope in the direction of the rotor rotation, while the ports in the stator-supported shells are made so as to form an angle $\beta = 180° - \alpha$.

The proposed design of a cryogen-cooled electrical machine permits increasing the reliability and efficiency of the vacuum heat insulation of the superconducting winding enclosed in the rotor due to the fact that the problem of rotor sealings for high vacuum, i.e., in the region of $10^{-5}$ torr, is entirely obviated, so that only sealings for a vacuum of about $10^{-3}$ torr are required which is not a problem at present.

In addition, evacuation of the annular gap between the rotor and the stator of the electrical machine is simplified, thus reducing manufacturing and operating costs.

An important feature is the simplicity of construction of the electrical machine and its small size.

Other features and advantages of the invention will become apparent from the following detailed description.

BRIEF DESCRIPTION OF THE DRAWINGS

An embodiment of the invention will now be described, by way of example, with reference to the accompanying drawings, in which:

FIG. 1 is a sectional view of an electrical machine according to the present invention; and FIG. 2 is an enlarged sectional view taken along line II—II in FIG. 1.

DETAILED DESCRIPTION OF THE DRAWINGS

The cryogen-cooled electrical machine comprises a rotor 1 (FIG. 1) having a superconducting winding (not shown) which is placed within a hollow stator 2 with an annular gap 3 which is evacuated and kept under a vacuum of about $10^{-5}$–$10^{-7}$ torr, thus providing heat insulation of the rotor 1. In this embodiment, each end face of the rotor 1 opposite a respective end shield 4 of the stator 2 carries four cylindrical shells 5 mounted thereon in a cantilevered fashion. Mounted on each end shield 4 in a cantilevered fashion are four cylindrical shells 6. The shells 5 and 6 are disposed concentrically with clearances therebetween.

The rotor 1 and the shells 5 rotate together and each pair of shells 5 and 6 acts as a stage of a turbomolecular pump. It can be readily seen that the number of shells 5 and 6 in the electrical machine may be two as well or even more, depending on the required degree of vacuum.

Formed between the shells 5 and 6 are a clearance 7 of high vacuum, i.e., $10^{-5}$–$10^{-7}$ torr, and a clearance 7 of low vacuum, i.e., $10^{-2}$ torr.

The end shields 4 accommodate vacuum-tight sealings 8 and bearing assemblies 9. The clearance 7 communicates with a forevacuum pump 10. The shells 6 and 7 are provided with ports 11. The axes of the ports 11 in the shells 5 form an acute angle $\alpha$ (FIG. 2) with tangent lines drawn to the periphery of the shell 5 from the points where these axes intersect the envelope in the direction of the rotor rotation.

The axes of the ports 11 in the shells 6 form, in a similar way, an angle $\beta = 180° - \alpha$.

A plurality of ports 11 in the movable and stationary shells 5 and 6, respectively, cause gas molecules to flow substantially in the direction of evacuation, i.e., from the periphery of the rotor to its axis, this resulting in that a vacuum of $10^{-5}$–$10^{-7}$ torr is achieved and maintained in the gap 3.

With the construction proposed herein, the electrical machine appears securely safeguarded against possible failures of the evacuation system, and in the event of a fault, the high-vacuum rotor insulation may yet long persist through use being made of the kinetic energy the rotor had accumulated before the fault occured, this preventing aggravation of the fault.

A considerable advantage offered by the invention is the long service life of the electrical machine, which is due to the fact that with the rotor cold, the gas flowing into the annular gap between the rotor and stator is easily pumped out by the rotor itself, this also being provided by the shortest evacuation path from the pump to the space wherein high vacuum is to be achieved and maintained.

What is claimed is:

1. A cryogen-cooled electrical machine comprising: a hollow stator and a rotor rotatably mounted within said hollow stator with an annular gap therebetween; each end of said machine having at least two cylindrical shells disposed concentrically with a clearance therebetween, one of said shells being movable and supported in a cantilevered fashion by said rotor on an end face thereof and the other being stationary and supported in a cantilevered fashion by the stator on an end faced thereof thereof opposite said end face of said rotor; said shells having ports serving to achieve and maintain vacuum in said gap between said hollow stator and said rotor, said ports in said rotor-supported shells having axes which form an acute angle $\alpha$ with tangent lines drawn to said shell periphery from the points where said axes intersect the envelope of said shell in the direction of rotation of said rotor, and said ports in said stator-supported shells having axes which form an angle $\beta = 180° - \alpha$ with tangent lines drawn to said shell periphery from the points where said axes intersect the envelope of said shell.

* * * * *